(167.)

WILLIAM KEARNEY.

Pipe Coupling.

No. 122,614.

Patented Jan. 9, 1872.

Witnesses
Chas. H. Smith
Geo. D. Walker

William Kearney
Lemuel W. Serrell
atty

UNITED STATES PATENT OFFICE.

WILLIAM KEARNEY, OF BERGEN COUNTY, NEW JERSEY.

IMPROVEMENT IN PIPE-COUPLINGS.

Specification forming part of Letters Patent No. 122,614, dated January 9, 1872.

*To all whom it may concern:*

Be it known that I, WILLIAM KEARNEY, of Bergen county, New Jersey, (address Bellville, Essex county, New Jersey,) have invented an Improvement in Pipe-Couplings; and the following is declared to be a correct description of the same.

Couplings for pipes have been made of a character to allow two lengths to be either in line or at an angle to each other, so as to accommodate inequalities in the surface of river beds and other places where such pipes are laid.

My invention accomplishes this object in a more perfect manner and allows considerable movement in the joint without risk of leakage, whereby the settling in the sand or mud at the bottom of a river, or the settling of the earth around the pipe, will not injure the joint or the pipe, and my joint is made so that one length of pipe can be taken out and another substituted, if injured, without disturbing other lengths of pipe.

I make the ends of the pipe as segments of globes with a rubber or elastic ring, and these are clamped within globular segmental cavities in boxes, which boxes are bolted together and provided with India-rubber packings to make the joints tight.

Figure 1:
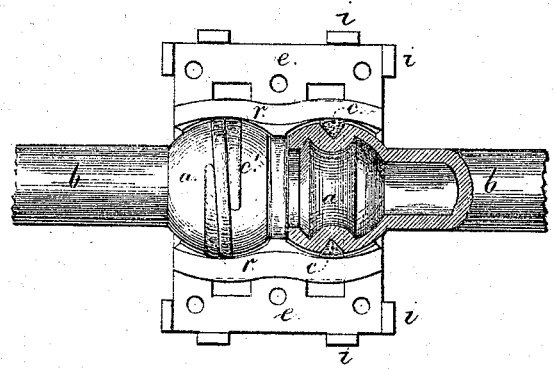
Figure 2:
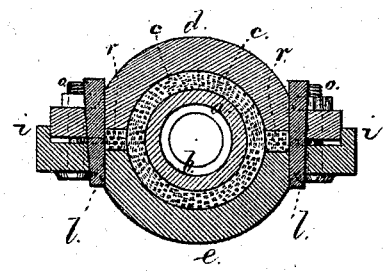

In the drawing, Figure 1 is a plan of the lower clamping-box with the pipe ends therein, one of said ends being in section; and Fig. 2 is a transverse section of said pipe and clamping-boxes.

Each end of each length of pipe is enlarged in the form of the segment of a globe, as at $a$, and this is cast with the pipe $b$, or it may be applied around the pipe or otherwise connected; and I remark that the pipe may be metal or other material. In each segment $a$ a groove is formed for the reception of India-rubber or other elastic packing $c$, and this groove may be single, double, or screw-formed, as at $c'$, according to the character of packing employed. The two halves $d$ and $e$ that are employed for receiving the segmental ends $a$ should be made of metal, and I prefer iron cast upon a metal core, so that the surface shall be smooth for the packing $c$ to come in contact with, and thus avoid the expense of smoothing the casting. The parts of the clamping-boxes $d$ and $e$ set together with lugs $i$, so as to prevent the parts moving upon each other, and clamping-bolts $o$ $o$, are employed to compress the boxes upon the packings $c$. It is necessary that the joint between the parts $d$ and $e$ should be made tight; for this purpose the strips of rubber or other elastic material $r$ $r$ are introduced, and I provide mortises through the boxes $d$ $e$ contiguous to the strips $r$ and adjacent to the packings $c$, and through these mortices keys $l$ $l$ are introduced, so that the elastic strips $r$ can be pressed by said keys up into contact with the packings $c$ to make a tight joint.

In laying this pipe it is preferable to clamp the ends of the pipe between the box $d$ $e$ with but a slight pressure until the pipe rests upon its bed or foundation, after which the keys $l$ are driven in sufficiently and the screw-bolts $o$ tightened to make the joint perfectly water-tight; however, should there be any settling of the pipe the joints will yield without injury.

It is preferable that both ends of each pipe be made with the ball-joints, and that each clamping-box have the two cavities before named; but it will be evident that the clamp $c$ $d$ might be attached around the cylindrical end of one pipe and receive the ball of the next length of pipe.

I claim as my invention—

1. The two-part clamping-boxes $d$ $e$ bolted together and made with globular segmental cavities for receiving the globular ends of the two contiguous lengths of pipe, substantially as set forth.

2. The keys $l$, introduced through the clamping-boxes $d$ $e$, in combination with the packings $c$ and $r$, as and for the purposes set forth.

Signed by me this 9th day of October, A. D. 1871.

WILLIAM KEARNEY.

Witnesses:
MICHAEL A. KEATING,
JAMES DOYLE.

(167)